United States Patent [19]
Wahl

[11] Patent Number: 5,363,378
[45] Date of Patent: Nov. 8, 1994

[54] CHANNEL DATA TRANSMISSION SYSTEM

[75] Inventor: Hans-Dieter Wahl, Kalchreuth, Germany

[73] Assignee: U.S. Philips Corporation, New York, N.Y.

[21] Appl. No.: 29,813

[22] Filed: Mar. 11, 1993

[30] Foreign Application Priority Data

Apr. 7, 1992 [EP] European Pat Off ............ 4-211671

[51] Int. Cl.⁵ ........................ H04J 3/06; H04L 5/22; H04L 7/04
[52] U.S. Cl. .............................. 370/100.1; 370/112; 375/106
[58] Field of Search .................. 370/100.1, 108, 112, 370/110.1; 375/37, 38, 106, 107, 108

[56] References Cited

U.S. PATENT DOCUMENTS

| | | | |
|---|---|---|---|
| 4,775,987 | 10/1988 | Miller | 375/38 |
| 4,818,995 | 4/1989 | Takahashi et al. | 375/38 |
| 5,058,133 | 10/1991 | Duncanson et al. | 375/38 |
| 5,231,649 | 7/1993 | Duncanson | 370/112 |

OTHER PUBLICATIONS

CCITT Recommendation H.221. and H. 261, Nov. 1989.

*Primary Examiner*—Wellington Chin
*Attorney, Agent, or Firm*—Anne E. Barschall

[57] ABSTRACT

A channel data transmission system is described, which data are structured channel-sequentially in frames and/or multiple frames. Such transmission systems are used, for example, for video conferencing during which data are exchanged over ISDN base channels. Since the bit rate, at which video codecs exchange their data, exceeds the bit rate, at which data can be transmitted over a base channel, no less than two base channels are to be provided for the intended data exchange. The signals of these base channels may be variably delayed on their way to the receiver. Cancelling this delay difference for a maximum of thirty base channels is the essential object of the multiplexer described. For achieving this object the received data (1a) of the base channels are channel-sequentially arranged and written in an addressable main memory (3). Detection means (11, 13, 13A, 14, 15, 16) are to detect frames and multiple frames among the stored data of one of each of the channels. If a frame or a multiple frame is detected in the data of a channel, the addressing means (6) are set with the aid of control means (4, 5, 16) so that, for example, the beginning of a multiple frame obtains a predetermined write address. The data of all the channels are multiplexed in that they are read out from the main memory (3).

10 Claims, 1 Drawing Sheet

CHANNEL DATA TRANSMISSION SYSTEM

BACKGROUND OF THE INVENTION

1. Field of the Invention

The invention relates to a data channel transmission system which data are channel-sequentially structured in frames and/or multiple frames.

2. Related Art

Such transmission systems are used, for example, for video conferencing which satisfies CCITT Recommendation H.261 and during which data are exchanged over an ISDN network. When data are exchanged between codecs over the ISDN network, a problem occurs which can be gathered from the following embodiments.

The bit rates for the video data of the codecs can be adjusted from 64 kbit/s to p*64 kbit/s, where p is an integer and satisfies the limitation $2 \leq p \leq 30$. Since also acoustic signals are to be transmitted, no less than two ISDN base channels of 64 kbit/s each are necessary for satisfying the minimum requirements made on, for example, a videophone operation. However, since the channels in the ISDN network are separately automatically switched, the two sub-signals might arrive at the same receiver with considerable time differences. Delay differences of the order of up to one second may be considered realistic.

More specifically, the following processes take place when data of a video codec are transmitted over an ISDN network: The video coder first issues a serial data stream structured in accordance with Recommendation H.261. This data stream has a bit rate of $p \times 64$ kbit/s. A demultiplexer distributes this data stream over p channels and the respective data of each of the channels are simultaneously arranged in frames according to CCITT Recommendation H.221. Optionally, also acoustic data are arranged in the H.221 frames. In the time-division multiplex method the data of one of these channels are transmitted over the ISDN network, whilst at worst the data of one of each of these channels reach the receiver through another path. A multiplexer on the receiver side thus has for its object to equalize the delay differences of the channel data and arrange them in such a way that a reconstruction to the original serial data stream is possible. Circuit arrangements by which the delay differences of two B channels are equalized are known (the H.221-Muldex Integrated Circuit. CSELT, Mar. 1, 1990). Attempts at equalizing the delay differences by signal processors have shown that already with two channels the computing performance of conventional processors is exhausted.

SUMMARY OF THE INVENTION

It is an object of the invention to provide a basic circuit for a multiplexer of the type defined in the opening paragraph, which is capable of combining the data of more than two time channels and whose concrete embodiments can be constructed with justifiable circuitry and cost.

For achieving this object, the following means are provided:

a) A main memory for channel-sequentially storing data of predetermined channels, comprising addressing means for addressing the main memory, b) Detection means for channel-sequentially detecting frames and/or multiple frames in the data stored in the main memory, c) Control means for setting the address means of the channel in which a frame and/or multiple frame is detected at a predetermined count.

Advantageous embodiments of the invention will be defined in the dependent claims.

BRIEF DESCRIPTION OF THE DRAWING

Exemplary embodiments of the invention will be further described with reference to the drawing Figures.

DETAILED DESCRIPTION OF THE PREFERRED EMBODIMENTS

Figure 1:
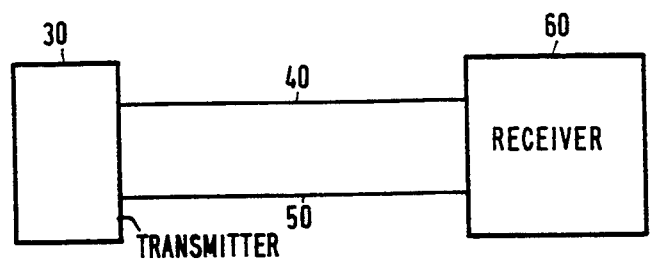
FIG. 1 shows a transmitter/receiver pair.

The transmitter 30 as shown in FIG. 1 is connected to the receiver 60 by two channels 40 and 50. The two channels 40 and 50 may comprise two separate transmission links, but also two time channels in, for example, a PCM-30 signal. For equalizing the possibly different delays between the channels, the measures according to the invention are taken.

Figure 2:
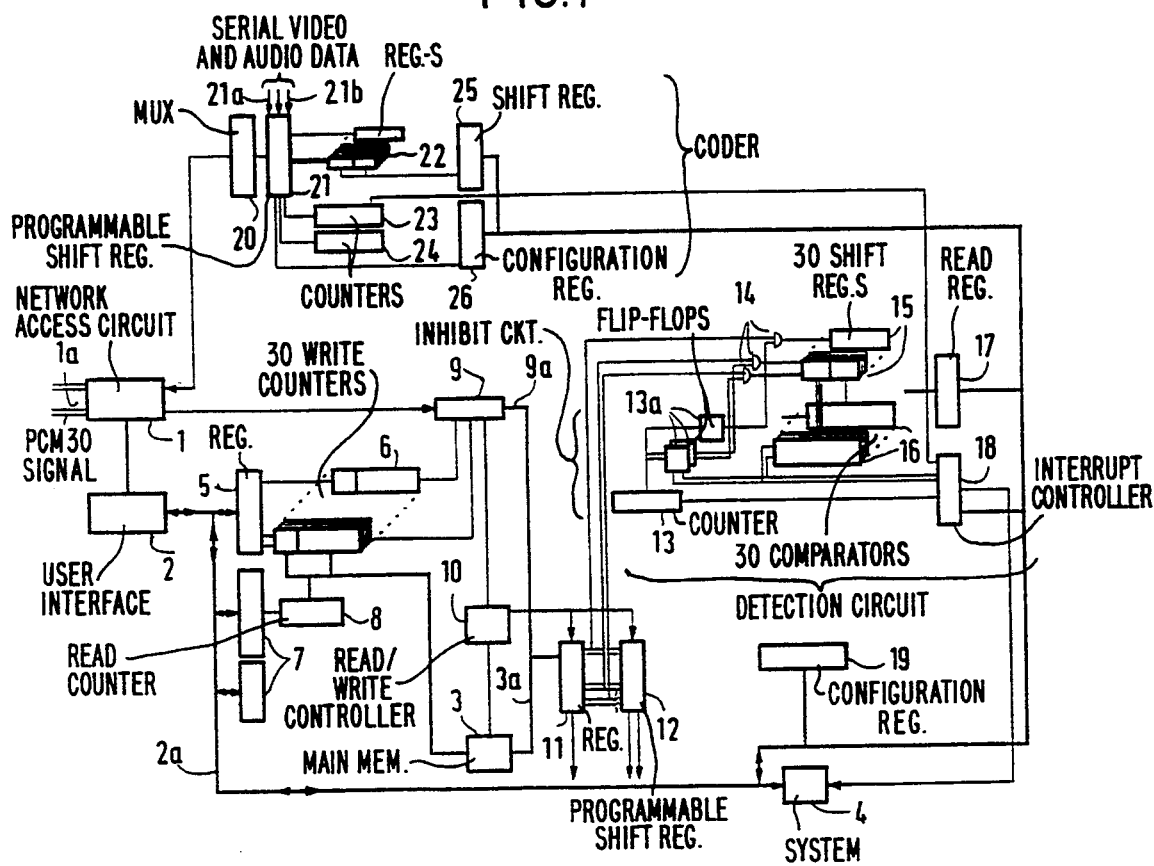
FIG. 2 shows a circuit according to the invention.

A network access circuit 1 (FIG. 2) recovers, for example, the bit clock from an incoming PCM-30 signal 1a, recognizes the PCM-30 frame and evaluates the information of the D channel. The D channel transports, for example, the information in which channels of the PCM-30 signal 1a the video data of a sending video codec are included, and in which order the data of these channels are to be combined for a reconstruction to the original serial data signal. These information signals are conveyed to a user interface 2 and from there transmitted to a system processor 4 over a bus 2a.

For brevity the same reference character will be used hereinafter for a line, for its terminals as well as for the signals transmitted over this line. In addition, the clock rates of modules will not be discussed, because the clock rates are known to the qualified expert.

According to the present embodiment the data of thirty channels of the PCM-30 signal belong to the data which are to be combined to a serial data stream. Once the signal 1a has passed through the network access circuit 1, it reaches an internal demultiplexer 9. With the aid of this demultiplexer 9 the data of the thirty channels are written channel and byte-sequentially in a main memory 3 over connections 9a and 3a. The main memory 3 is a RAM having a storage capacity of 256 kbytes.

Auxiliary means for controlling the write and read operations for the main memory 3 are a write/read controller 10, thirty write counters 6 and a read counter 8. The counters 6 and 8 produce the write and read addresses respectively, for the main memory 3. A respective 18-stage write counter is provided for the data of each of the time channels which are written in the main memory 3. The five most significant stages of this counter can be adjusted independently of the remaining stages and are set once at the beginning of the transmission. The binary number in the stages denotes the page number in the main memory 3 at which the data of a time channel are to be stored. The page numbers are identical with the channel numbers (in this case thirty numbers). Which counter is to be set at which page number is defined in the information signals of the D channel and the in-band signalling.

The remaining thirteen stages of each of the counters 6 denote the addresses for the bytes which are stored on a page of the memory. With these stages 8,192 memory locations can be addressed. These stages of the counters, however, are already reset at a count of 7,679. Consequently, the address range from zero to 7,679 is cyclically passed through in so far as the cycles are not interrupted by specific disruptions (cf. hereinafter). From these details it specifically follows that in the main memory 3 a signal section of 0.96 second can be buffered per channel.

The read addresses are produced by the 18-stage read counter 8 in that the first byte of the first page is read out from the main memory 3 at its lowest count. At the next higher count the first byte of the second page is read out and so forth, up to the first byte of the thirtieth page. After that the second byte of all the pages will accordingly be proceeded with, up to the last byte of the thirtieth page. As may be easily noticed, the read signal has the structure of the originally transmitted serial data stream in so far as there is no time shift between the data of the individual time channels. Especially this shift is to be reckoned with in the case of a transmission over the ISDN network, which was observed at the beginning of this document.

For correcting the time shift, use is made of the fact that the data of the time channels are structured in H.221 frames and multiple frames. Frames are repeated after 80 bytes and multiple frames are repeated after sixteen frames.

The eighth bits of the first sixteen bytes of a frame form the frame code signal (cf. CCITT Recommendation H.221), which comprises, for example, the frame code word as well as the number of a frame relative to the beginning of a multiple frame, or the multiple frame code signal.

For identifying the code signals, the data of all the channels are transferred to a thirty-byte register 11 in above-mentioned order. These bits are evaluated by a detection circuit 13, 13A, 14, 15, 16 and 17, coupled to the register 11 by thirty connections. Every eighth bit of the bytes stored in the register 11 is transmitted over these connections.

The detection circuit comprises thirty shift registers 15 operated in parallel and containing each sixteen stages, thus enough stages that the whole code signal of a H.221 frame can be stored in the stages.

First a new bit is read into these shift registers 15 every 125 microseconds. Each of these shift registers 15 is connected in parallel with a comparator circuit 16 which verifies whether the frame code word is contained in the allocated shift register 15.

If this is the case for one of the shift registers 15, its complete contents are taken over by an allocated read register 17. In addition, the bottommost four stages of the allocated write counter 6 are reset to zero over a line (not shown) from the comparator circuit 16 to the reset input of these stages. At the same time an inhibit circuit 13, 13A, 14 interrupts the transfer of further bits to the relevant shift register for the next 64 shift clock periods. The inhibit circuit comprises a 16-to-80 counter 13, a flip-flop 13A and a gate 14.

As a result of the action of the inhibit circuit, the next comparison will not be made until after eighty bytes. Subsequently—if the first comparison has led to a positive and appropriate result—another frame codeword will appear. In this case the inhibit circuit remains active and all the operations following the first positive result of the comparison are repeated. If the comparison leads to a negative result, the action of the inhibit circuit is terminated and a new search is made for the frame codeword. The program routine for the system processor 4 is then adapted to the result of the comparison by means of an interrupt controller 18.

The system processor 4 fetches the frame code signals for each channel from the thirty read registers 17, evaluates them and sets the remaining 9 stages of the write counter 6 via the register 5. If all the thirty write counters 6 operate in synchronism, thirty bytes are written into the register 11 in the order of the originally transmitted data stream; the time shift is thus equalized.

With a programmable shift register 12 the originally transmitted data stream is freed from H.221 frame information signals, so that only audio data or video data occur as output signals of the shift registers 11, 12. The program mask for the shift register 12 is stored in the configuration register 19.

The modules 20 to 26 schematically show an appropriate coder, which combines serial video data 21a and serial audio data 21b with the aid of programmable shift register 21 and a multiplexer 20 to a PCM-30 signal which has the same structure as the received PCM-30 signal 1a. Connected to the programmable shift register are 16-to-80 counters 23 and 24 as well as registers for interleaving the H.221 frame information signals 22. These frame information signals are written into the shift register 25 by the system processor 4. The program mask for the register 21 is stored in the configuration register 26.

I claim:

1. Transmission system comprising a transmitter and a receiver for transmitting related data over at least two channels, the receiver including means for multiplexing received data, which data are structured channel-sequentially in frames and/or multiple frames, characterized in that the receiver comprises:
    a) main memory (3), for storing, channel-sequentially, data of predetermined ones of the at least two channels, comprising addressing means for addressing the main memory (3),
    b) detection means (11, 13, 13A, 14, 15, 16) for detecting, channel-sequentially, frames and/or multiple frames in the data stored in the main memory (3),
    c) control means (6,8) for setting the addressing means, with respect to one of the predetermined channels in which a frame and/or multiple frame is detected, at a predetermined count, whereby the means for addressing is initialized.

2. Transmission system as claimed in claim 1, characterized in that the receiver comprises separate control means (4, 16) for setting the addressing means for separate address ranges to a predetermined count.

3. Transmission system as claimed in claim 1, characterized in that the addressing means (6) comprise a write counter (6).

4. Transmission system as claimed in claim 1, characterized in that the predetermined count is the same for all the predetermined channels.

5. Transmission system as claimed in claim 1, characterized in that a processor (4) is provided as part of the control means.

6. Receiver for related data of at least two channels, the receiver including means for multiplexing received data, the data being structured channel-sequentially in frames and/or multiple frames, characterized in that the receiver comprises:

a) main memory (3), for storing, channel-sequentially, data of predetermined ones of the at least two channels, comprising addressing means for addressing the main memory (3),
b) detection means (11, 13, 13A, 14, 15, 16) for detecting, channel-sequentially, frames and/or multiple frames in the data stored in the main memory (3),
c) control means (6,8) for setting the addressing means, with respect to one of the predetermined channels in which a frame and/or multiple frame is detected, at a predetermined count, whereby the means for addressing is initialized.

7. Receiver as claimed in claim 6, characterized in that the multiplexer comprises separate control means (4, 16) for setting the addressing means for separate address ranges at a predetermined count.

8. Receiver as claimed in claim 6, characterized in that the addressing means (6) comprise a write counter (6).

9. Receiver as claimed in claim 6, characterized in that the predetermined count is the same for all the predetermined channels.

10. Receiver as claimed in claim 6, characterized in that a processor (4) is provided as part of the control means.

* * * * *